United States Patent
Alshinnawi et al.

(10) Patent No.: US 9,501,128 B2
(45) Date of Patent: *Nov. 22, 2016

(54) COOPERATIVE REDUCED POWER MODE SUSPENSION FOR HIGH INPUT/OUTPUT ('I/O') WORKLOADS

(71) Applicant: GLOBALFOUNDRIES Inc., Grand Cayman (KY)

(72) Inventors: Shareef F. Alshinnawi, Durham, NC (US); Gary D. Cudak, Creedmoor, NC (US); Jarrod B. Johnson, Raleigh, NC (US); Bryan M. Reese, Durham, NC (US)

(73) Assignee: GlobalFoundries Inc. (KY)

(*) Notice: Subject to any disclaimer, the term of this patent is extended or adjusted under 35 U.S.C. 154(b) by 194 days.

This patent is subject to a terminal disclaimer.

(21) Appl. No.: 14/067,314

(22) Filed: Oct. 30, 2013

(65) Prior Publication Data
US 2015/0121094 A1    Apr. 30, 2015

(51) Int. Cl.
G06F 1/32      (2006.01)
G06F 1/26      (2006.01)
G06F 3/00      (2006.01)
H04L 29/08     (2006.01)

(52) U.S. Cl.
CPC ............ *G06F 1/3234* (2013.01); *G06F 1/32* (2013.01); *G06F 1/3203* (2013.01); *G06F 1/3206* (2013.01); *G06F 1/329* (2013.01); *G06F 1/3209* (2013.01); *G06F 1/3243* (2013.01); *G06F 1/3246* (2013.01); *G06F 1/3287* (2013.01); *H04L 67/06* (2013.01); *G06F 1/26* (2013.01)

(58) Field of Classification Search
None
See application file for complete search history.

(56) References Cited

U.S. PATENT DOCUMENTS

| 6,289,464 B1* | 9/2001 | Wecker | G06F 1/1616 340/7.33 |
| 6,553,476 B1* | 4/2003 | Ayaki | G06F 3/0601 386/E5.042 |
| 6,631,434 B1* | 10/2003 | Johnson | G06F 13/24 710/260 |
| 6,731,924 B2* | 5/2004 | Gushiken | G06F 13/385 370/311 |
| 8,347,119 B2 | 1/2013 | Song | |
| 2003/0115428 A1* | 6/2003 | Zaccarin | G06F 1/3203 711/156 |
| 2004/0064607 A1 | 4/2004 | Odakura et al. | |

(Continued)

OTHER PUBLICATIONS

Intel, "Intel® Xeon® Processor E5-1600/E5-2600/E5-4600 Product Families", Datasheet—vol. 1, May 2012, 258 pages, Intel Corporation, USA.

(Continued)

*Primary Examiner* — Tanh Nguyen
(74) *Attorney, Agent, or Firm* — DeLio, Peterson & Curcio, LLC; Peter W. Peterson

(57) ABSTRACT

Method of cooperative reduced power mode suspension for high input/output ('I/O') workloads, including: determining, by a transfer monitoring module, a size of a file to be transferred to a recipient, wherein the recipient includes a central processing unit ('CPU') operating in a reduced power mode; determining, by the transfer monitoring module, a desired transfer rate for transferring the file to the recipient; calculating, by the transfer monitoring module, an expected transfer completion time in dependence upon the size of the file and the desired transfer rate; and sending, by the transfer monitoring module, a message to the recipient requesting that the CPU suspend the reduced power mode in dependence upon the expected transfer completion time.

6 Claims, 6 Drawing Sheets

(56) References Cited

U.S. PATENT DOCUMENTS

| | | | | |
|---|---|---|---|---|
| 2006/0123259 | A1* | 6/2006 | Yokota | G06F 1/3221 713/320 |
| 2008/0002603 | A1* | 1/2008 | Hutsell | G06F 1/3203 370/318 |
| 2009/0077401 | A1* | 3/2009 | Tsai | G06F 1/3209 713/320 |
| 2010/0169684 | A1* | 7/2010 | Jeyaseelan | G06F 1/3203 713/323 |
| 2010/0287396 | A1 | 11/2010 | Barth et al. | |
| 2013/0097437 | A9 | 4/2013 | Naveh et al. | |
| 2013/0198538 | A1* | 8/2013 | Diab | G06F 1/3278 713/310 |
| 2014/0208138 | A1* | 7/2014 | Homchaudhuri | G06F 1/3209 713/320 |
| 2015/0121094 | A1* | 4/2015 | Alshinnawi | G06F 1/3234 713/310 |

OTHER PUBLICATIONS

Vaughan-Nichols, "Beyond RAID: IBM Adds Big Data Friendly, Affordable Servers to Line Up", Between the Lines (online publication), zdnet.com, Nov. 2012, 4 pages, URL: http://www.zdnet.com/beyond-raid-ibm-adds-big-data-friendly-affordable-servers-to-line-up-7000007218/.

Naveh et al., "Power and Thermal Management in the Intel® Core™ Duo Processor", Intel® Technology Journal: *Intel® Centrino® Duo Mobile Technology*, vol. 10, Issue 2, May 2006, pp. 109-122, Intel Corporation, USA.

Torres, "Everything You Need to Know About the CPU C-States Power Saving Modes", (online publication), hardwaresecrets.com, Sep. 2008, 6 pages, URL: http://www.hardwaresecrets.com/article/611.

Kant et al., "Proactive vs. Reactive Idle Power Control", Proceedings of Intel's Design and Test Technology Conference (DTTC), Aug. 2008, pp. 1-10, Intel Corporation, Portland Oregon USA.

* cited by examiner

COOPERATIVE REDUCED POWER MODE SUSPENSION FOR HIGH INPUT/OUTPUT ('I/O') WORKLOADS

BACKGROUND OF THE INVENTION

Field of the Invention

The field of the invention is data processing, or, more specifically, methods, apparatus, and products for cooperative reduced power mode suspension for high input/output ('I/O') workloads.

Description Of Related Art

When system CPUs are in low levels of usage, they enter low power states, known as c-states, to save power. For large data centers, the power and subsequent monetary savings are significant. With the ever increasing speed of high performance computing transports, which can transfer data at very high rates, placing CPUs in a low power state can create issues. For example, incoming data received over a high speed transport can result in a memory buffer filling before the buffer can be processed by a CPU in a c-state. In such an example, data communications may fail as the recipient is unable to process incoming packets.

SUMMARY OF THE INVENTION

Methods, apparatuses, and products for cooperative reduced power mode suspension for high I/O workloads, including: determining, by a transfer monitoring module, a size of a file to be transferred to a recipient, wherein the recipient includes a central processing unit ('CPU') operating in a reduced power mode; determining, by the transfer monitoring module, a desired transfer rate for transferring the file to the recipient; calculating, by the transfer monitoring module, an expected transfer completion time in dependence upon the size of the file and the desired transfer rate; and sending, by the transfer monitoring module, a message to the recipient requesting that the CPU suspend the reduced power mode in dependence upon the expected transfer completion time.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
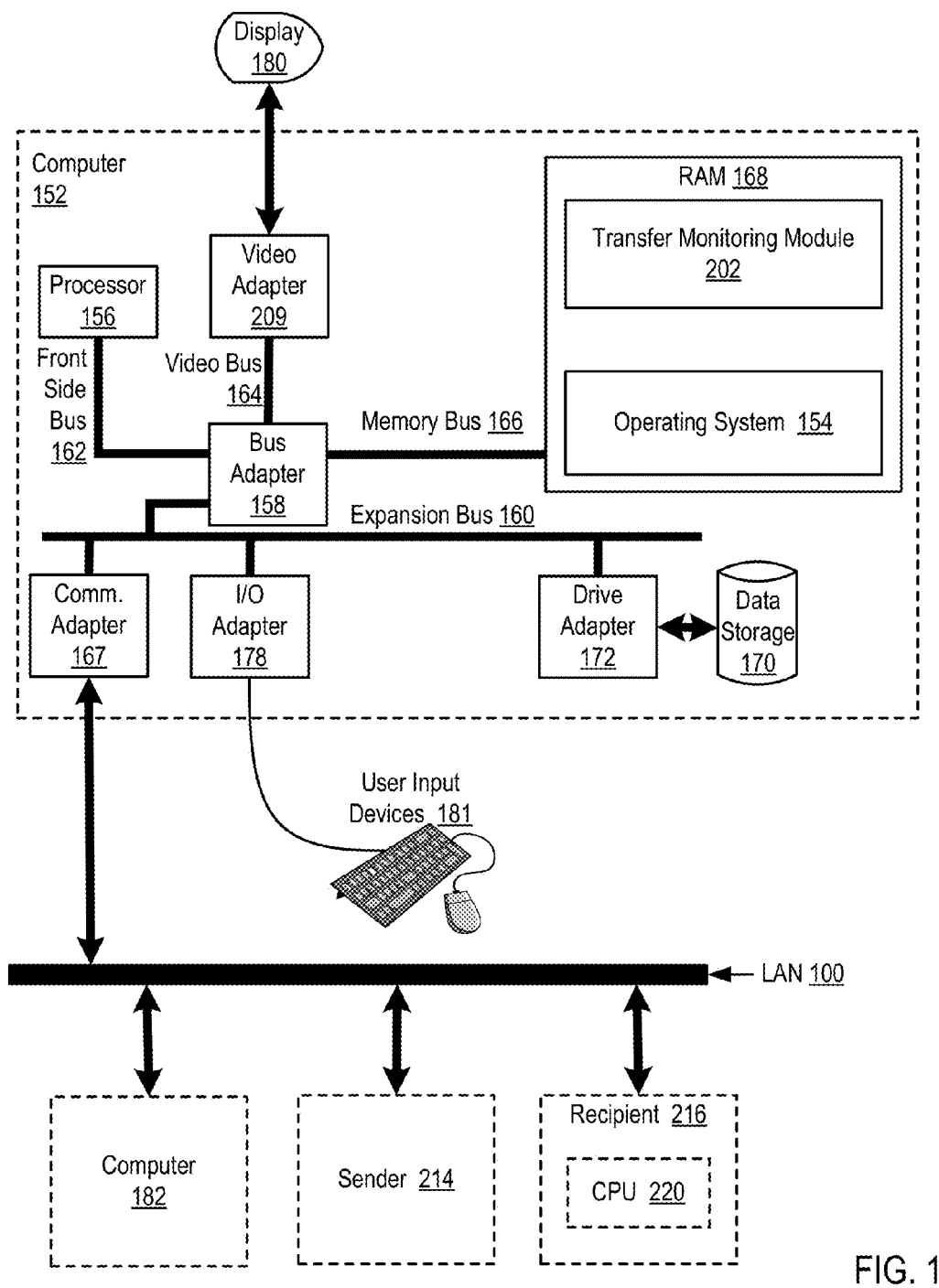
FIG. 1 sets forth a block diagram of automated computing machinery comprising an example computer useful in cooperative reduced power mode suspension for high I/O workloads according to embodiments of the present invention.

Example methods, apparatus, and products for cooperative reduced power mode suspension for high I/O workloads in accordance with the present invention are described with reference to the accompanying drawings, beginning with FIG. 1. FIG. 1 sets forth a block diagram of automated computing machinery comprising an example computer (152) useful in cooperative reduced power mode suspension for high I/O workloads according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is a transfer monitoring module (202), a module of computer program instructions for cooperative reduced power mode suspension for high I/O workloads according to embodiments of the present invention. In the example of FIG. 1, the transfer monitoring module (202) is depicted as being separate from the sender (214) and the recipient (216). The transfer monitoring module (202) may reside, for example, within a system management module in a blade center where the sender (214) and the recipient (216) are embodied as blades within the blade center. Alternatively, the transfer monitoring module (202) may reside within a system management module in a parallel computer where the sender (214) and the recipient (216) are embodied as nodes within the parallel computer. In other embodiments, the transfer monitoring module (202) may be embodied as one or more modules of computer program instructions that reside within the sender (214), the recipient (216), or any combination thereof.

The transfer monitoring module (202) of FIG. 1 may be configured to carry out cooperative reduced power mode suspension for high I/O workloads by determining a size of a file to be transferred to a recipient (216) by a sender (214). The size of a file to be transferred from a sender (214) to a recipient (216) may be expressed as the number of messages of a predetermined size that are required to transfer the file from the sender (214) to the recipient (216), as the number of bytes contained in the file, as the number of slots within a transmission buffer maintained by the sender (214) that the file resides in, and so on.

The recipient (216) of FIG. 1 may include a CPU (220) operating in a reduced power mode. The reduced power mode may represent an operational mode of the CPU (220) where the CPU (220) is operating in a power conserving mode. In such an example, the CPU (220) is operating in a mode that sacrifices processing capabilities in exchange for reducing the amount of power consumed by the CPU (220). The reduced power mode can include a c-state mode, versus a p-state mode, where a CPU (220) is configured to switch between different supported operating frequencies and voltages to modulate power consumption.

The transfer monitoring module (202) of FIG. 1 may be further configured to carry out cooperative reduced power mode suspension for high I/O workloads by determining a desired transfer rate for transferring the file to the recipient (216). The desired transfer rate for transferring the file to the recipient (216) may be a function of the type of data communications link between the sender (214) and the recipient (216). For example, the desired transfer rate for transferring the file to the recipient (216) may be different when the sender (214) and the recipient (216) are connected via a 10 Gb/s Ethernet connection versus when the sender (214) and the recipient (216) are connected via a 40 Gb/s InfiniBand connection. In such an example, determining a desired transfer rate for transferring the file to the recipient (216) may be carried out by determining the type of network connection between the sender (214) and the recipient (216) and setting the desired transfer rate for transferring the file to the maximum transmission rate supported by the network connection between the sender (214) and the recipient (216).

The transfer monitoring module (202) of FIG. 1 may be configured to carry out cooperative reduced power mode suspension for high I/O workloads by calculating an expected transfer completion time in dependence upon the size of the file and the desired transfer rate. Calculating an expected transfer completion time in dependence upon the size of the file and the desired transfer rate may be carried out, for example, by dividing the size of the file by the desired transfer rate. In such an example, the expected transfer completion time may be expressed in terms of an amount of time needed to transfer the file, a number of messages needed to transfer the file, and so on.

The transfer monitoring module (202) of FIG. 1 may be configured to carry out cooperative reduced power mode suspension for high I/O workloads by sending a message to the recipient (216) requesting that the CPU (220) suspend the reduced power mode in dependence upon the expected transfer completion time. The CPU (220) may suspend the reduced power mode by operating in a full power mode such that the CPU (220) is operating at its maximum processing frequency. The transfer monitoring module (202) may send a message to the recipient (216) requesting that the CPU (220) suspend the reduced power mode in anticipation of the sender (214) sending the file to the recipient (216). In such an example, as packets that contain portions of the file are received by the recipient (216), operating the CPU (220) in a reduced power mode may cause a receive buffer of the recipient (216) to fill up as the CPU (220) may not process packets rapidly enough to avoid receive buffer of the recipient (216) to filling up, thereby causing the delivery of packets from the sender (214) to the recipient (216) to fail. Sending a message to the recipient (216) requesting that the CPU (220) suspend the reduced power mode—and operate in a higher performance, higher power consuming mode—may enable the CPU (220) to process packets rapidly enough to avoid causing the receive buffer of the recipient (216) to fill up, thereby preventing the delivery of packets from the sender (214) to the recipient (216) from failing.

The transfer monitoring module (202) of FIG. 1 may be configured to carry out cooperative reduced power mode suspension for high I/O workloads by sending the message to the recipient (216) requesting that the CPU (220) suspend the reduced power mode is done in dependence upon the expected transfer completion time. As such, the message may include information indicating the expected transfer completion time such that the CPU (220) of the recipient (216) suspends the reduced power mode for a period of time that is sufficient to complete the transfer of the file from the sender (214) to the recipient (216). Upon the expiration of the expected transfer completion time, the CPU (220) in the recipient may resume operating in the reduced power mode. The message may be sent to the recipient (216) over a data communications connection between the recipient (216) and the transfer monitoring module (202). Such a data communications connection may be embodied, for example, as an Ethernet connection, as an InfiniBand connection, and so on.

Also stored in RAM (168) is an operating system (154). Operating systems useful cooperative reduced power mode suspension for high I/O workloads according to embodiments of the present invention include UNIX™, Linux™, Microsoft XP™, AIX™, IBM's i5/OS™, and others as will occur to those of skill in the art. The operating system (154) and the transfer monitoring module (202) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for cooperative reduced power mode suspension for high I/O workloads according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for cooperative reduced power mode suspension for high I/O workloads according to embodiments of the present invention include modems for wired dial-up communications, Ethernet (IEEE 802.3) adapters for wired data communications network communications, and 802.11 adapters for wireless data communications network communications.

Figure 2:
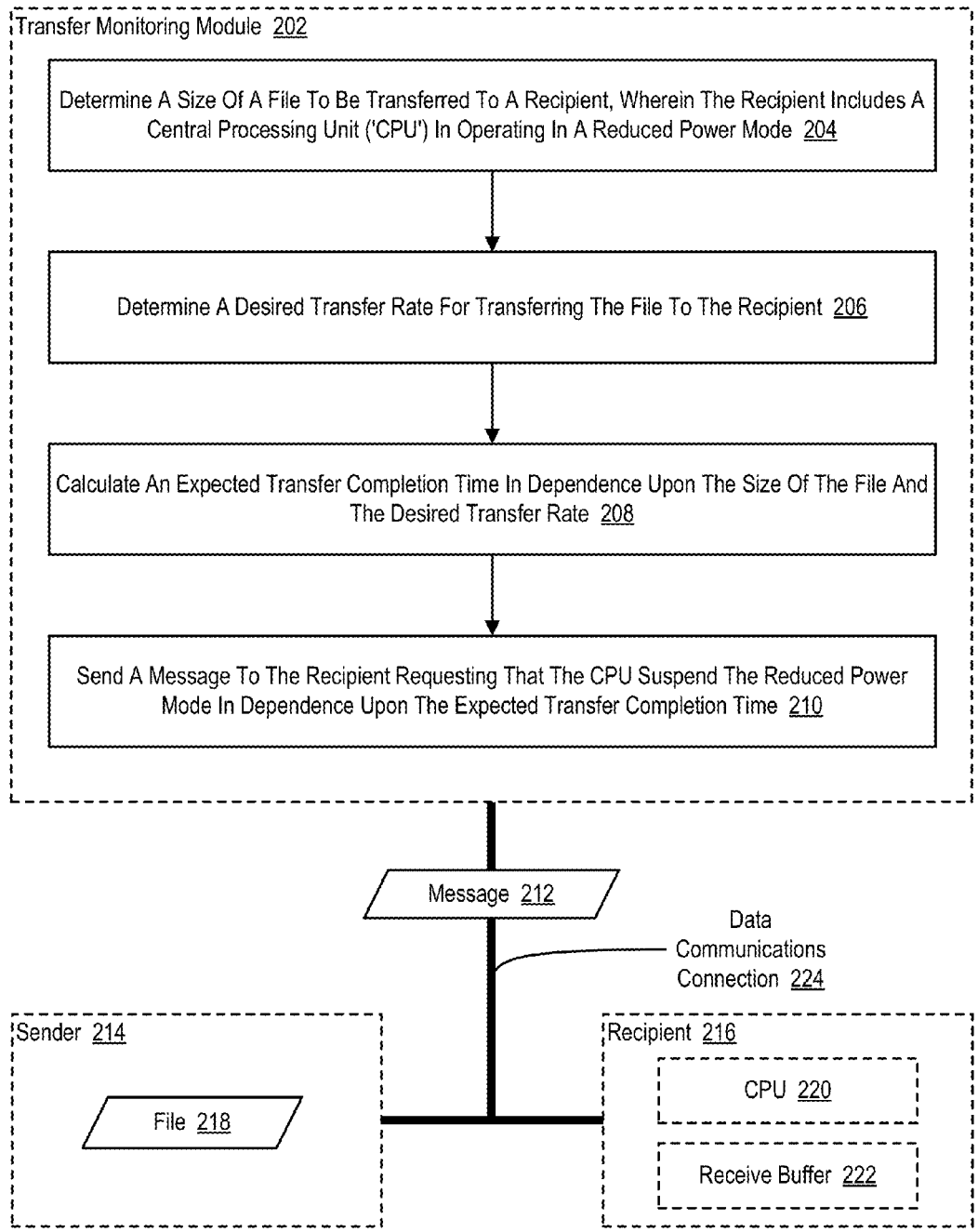
FIG. 2 sets forth a flow chart illustrating an example method for cooperative reduced power mode suspension for high I/O workloads according to embodiments of the present invention.

For further explanation, FIG. 2 sets forth a flow chart illustrating an example method for cooperative reduced power mode suspension for high I/O workloads according to embodiments of the present invention. The example method of FIG. 2 is carried out, at least in part, by a transfer monitoring module (202). The transfer monitoring module (202) of FIG. 2 may be embodied as a module of computer program instructions executing on computer hardware such as a CPU.

In the example method of FIG. 2, the transfer monitoring module (202) is depicted as being separate from the sender (214) and the recipient (216). The transfer monitoring module (202) may reside, for example, within a system management module in a blade center where the sender (214) and the recipient (216) are embodied as blades within the blade center. Alternatively, the transfer monitoring module (202) may reside within a system management module in a parallel computer where the sender (214) and the recipient (216) are embodied as nodes within the parallel computer. In other embodiments, the transfer monitoring module (202) may be embodied as one or more modules of computer program instructions that reside within the sender (214), the recipient (216), or any combination thereof.

The example method of FIG. 2 includes determining (204), by a transfer monitoring module (202), a size of a file (218) to be transferred to a recipient (216) by a sender (214). In the example method of FIG. 2, the size of a file (218) to be transferred from a sender (214) to a recipient (216) may be expressed as the number of messages of a predetermined size that are required to transfer the file (218) from the sender (214) to the recipient (216), as the number of bytes contained in the file (218), as the number of slots within a transmission buffer maintained by the sender (214) that the file (218) resides in, and so on.

In the example method of FIG. 2, the recipient (216) includes a CPU (220) operating in a reduced power mode. In the example method of FIG. 2, a reduced power mode may represent an operational mode of the CPU (220) where the CPU (220) is operating in a power conserving mode. In such an example, the CPU (220) is operating in a mode that sacrifices processing capabilities in exchange for reducing the amount of power consumed by the CPU (220). The reduced power mode can include a c-state mode, versus a p-state mode, where a CPU (220) is configured to switch between different supported operating frequencies and voltages to modulate power consumption.

The example method of FIG. 2 also includes determining (206), by the transfer monitoring module (202), a desired transfer rate for transferring the file (218) to the recipient (216). In the example method of FIG. 2, the desired transfer rate for transferring the file (218) to the recipient (216) may be a function of the type of data communications link between the sender (214) and the recipient (216). For example, the desired transfer rate for transferring the file (218) to the recipient (216) may be different when the sender (214) and the recipient (216) are connected via a 10 Gb/s Ethernet connection versus when the sender (214) and the recipient (216) are connected via a 40 Gb/s InfiniBand connection. In such an example, determining (206) a desired transfer rate for transferring the file (218) to the recipient (216) may be carried out by determining the type of network connection between the sender (214) and the recipient (216) and setting the desired transfer rate for transferring the file (218) to the maximum transmission rate supported by the network connection between the sender (214) and the recipient (216).

The example method of FIG. 2 also includes calculating (208), by the transfer monitoring module (202), an expected transfer completion time in dependence upon the size of the file (218) and the desired transfer rate. In the example method of FIG. 2, calculating (208) an expected transfer completion time in dependence upon the size of the file (218) and the desired transfer rate may be carried out, for example, by dividing the size of the file (218) by the desired transfer rate. In such an example, the expected transfer completion time may be expressed in terms of an amount of time needed to transfer the file (218), a number of messages needed to transfer the file (218), and so on.

The example method of FIG. 2 includes sending (210), by the transfer monitoring module (202), a message (212) to the recipient (216) requesting that the CPU (220) suspend the reduced power mode in dependence upon the expected transfer completion time. In the example method of FIG. 2, the CPU (220) may suspend the reduced power mode by operating in a full power mode such that the CPU (220) is operating at its maximum processing frequency. The transfer monitoring module (202) may send (210) a message (212) to the recipient (216) requesting that the CPU (220) suspend the reduced power mode in anticipation of the sender (214) sending the file (218) to the recipient (216). In such an example, as packets that contain portions of the file (218) are received by the recipient (216), operating the CPU (220) in a reduced power mode may cause a receive buffer (222) of the recipient (216) to fill up as the CPU (220) may not process packets rapidly enough to avoid receive buffer (222) of the recipient (216) to filling up, thereby causing the delivery of packets from the sender (214) to the recipient (216) to fail. Sending (210) a message (212) to the recipient (216) requesting that the CPU (220) suspend the reduced power mode—and operate in a full power mode—may enable the CPU (220) to process packets rapidly enough to avoid causing the receive buffer (222) of the recipient (216) to fill up, thereby preventing the delivery of packets from the sender (214) to the recipient (216) from failing.

In the example method of FIG. 2, sending (210) the message (212) to the recipient (216) requesting that the CPU (220) suspend the reduced power mode is done in dependence upon the expected transfer completion time. As such, the message (212) may include information indicating the expected transfer completion time such that the CPU (220) of the recipient (216) suspends the reduced power mode for a period of time that is sufficient to complete the transfer of the file (218) from the sender (214) to the recipient (216). Upon the expiration of the expected transfer completion time, the CPU (220) in the recipient may resume operating in the reduced power mode. In the example method of FIG. 2, the message (212) is sent (210) to the recipient (216) over a data communications connection (224) between the recipient (216) and the transfer monitoring module (202). Such a data communications connection (224) may be embodied, for example, as an Ethernet connection, as an InfiniBand connection, and so on.

Figure 3:
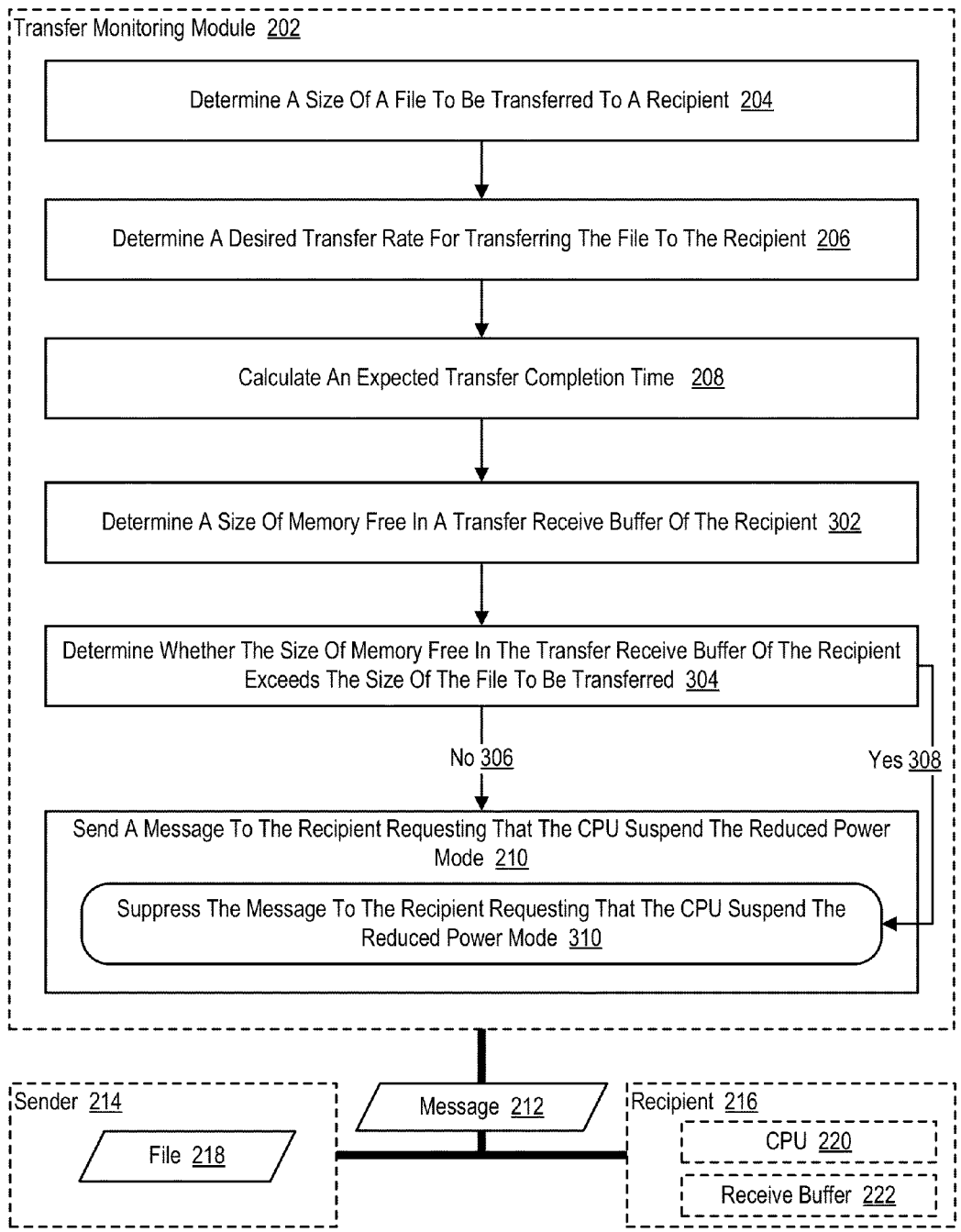
FIG. 3 sets forth a flow chart illustrating an additional example method for cooperative reduced power mode suspension for high I/O workloads according to embodiments of the present invention.

For further explanation, FIG. 3 sets forth a flow chart illustrating an additional example method for cooperative reduced power mode suspension for high I/O workloads according to embodiments of the present invention. The example method of FIG. 3 similar to the example method of FIG. 2 as it also includes determining (204) a size of a file (218) to be transferred to a recipient (216) by a sender (214), determining (206) a desired transfer rate for transferring the file (218) to the recipient (216), calculating (208) an expected transfer completion time in dependence upon the size of the file (218) and the desired transfer rate, and sending (210) a message (212) to the recipient (216) requesting that the CPU (220) suspend the reduced power mode in dependence upon the expected transfer completion time.

The example method of FIG. 3 also includes determining (302), by the transfer monitoring module (202), a size of memory free in a transfer receive buffer (222) of the recipient (216). The recipient (216) of FIG. 3 may include, or otherwise have access to, a transfer receive buffer (222). The transfer receive buffer (222) may be embodied as a data structure supported by computer memory in which all messages directed to the recipient (216) are stored for processing by the CPU (220) of the recipient (216). In such an example, messages directed to the recipient (216) are stored in the transfer receive buffer (222) and removed according to an algorithm (e.g., a FIFO algorithm) as the CPU (220) of the recipient (216) processes the messages in the transfer receive buffer (222).

The example method of FIG. 3 also includes determining (304), by the transfer monitoring module (202), whether the size of memory free in the transfer receive buffer (222) of the recipient (216) exceeds the size of the file (218) to be transferred. In the example method of FIG. 3, determining (304) whether the size of memory free in the transfer receive buffer (222) of the recipient (216) exceeds the size of the file (218) to be transferred may be carried out, for example, by comparing the size of the file (218) to the size of available memory in the transfer receive buffer (222) of the recipient (216). In such an example, when the size of memory free in the transfer receive buffer (222) of the recipient (216) exceeds the size of the file (218) to be transferred, there is no risk that the receive buffer (222) of the recipient (216) will be filled up by the transfer and therefore no risk that the delivery of packets from the sender (214) to the recipient (216) will fail by virtue of the CPU (220) of the recipient (216) failing to process packets quickly enough.

In the example method of FIG. 3, sending (210) a message (212) to the recipient (216) requesting that the CPU (220) suspend the reduced power mode in dependence upon the expected transfer completion time can include suppressing (310) the message (212) to the recipient (216) requesting that the CPU (220) suspend the reduced power mode. In the example method of FIG. 3, suppressing (310) the message (212) to the recipient (216) requesting that the CPU (220) suspend the reduced power mode is carried out in response to affirmatively (308) determining that the size of memory free in the transfer receive buffer (222) of the recipient (216) exceeds the size of the file (218) to be transferred. In such a way, the CPU (220) of the recipient (216) can avoid entering a mode that consumes additional power when the transfer of the file (218) to the recipient (216) will not cause the receive buffer (222) of the recipient (216) to be filled up and the delivery of subsequent packets to fail. In the example method of FIG. 3, if it is determined that the size of memory free in the transfer receive buffer (222) of the recipient (216) does not (306) exceed the size of the file (218) to be transferred, a message (212) may be sent (210) to the recipient (216) requesting that the CPU (220) suspend the reduced power mode.

Figure 4:
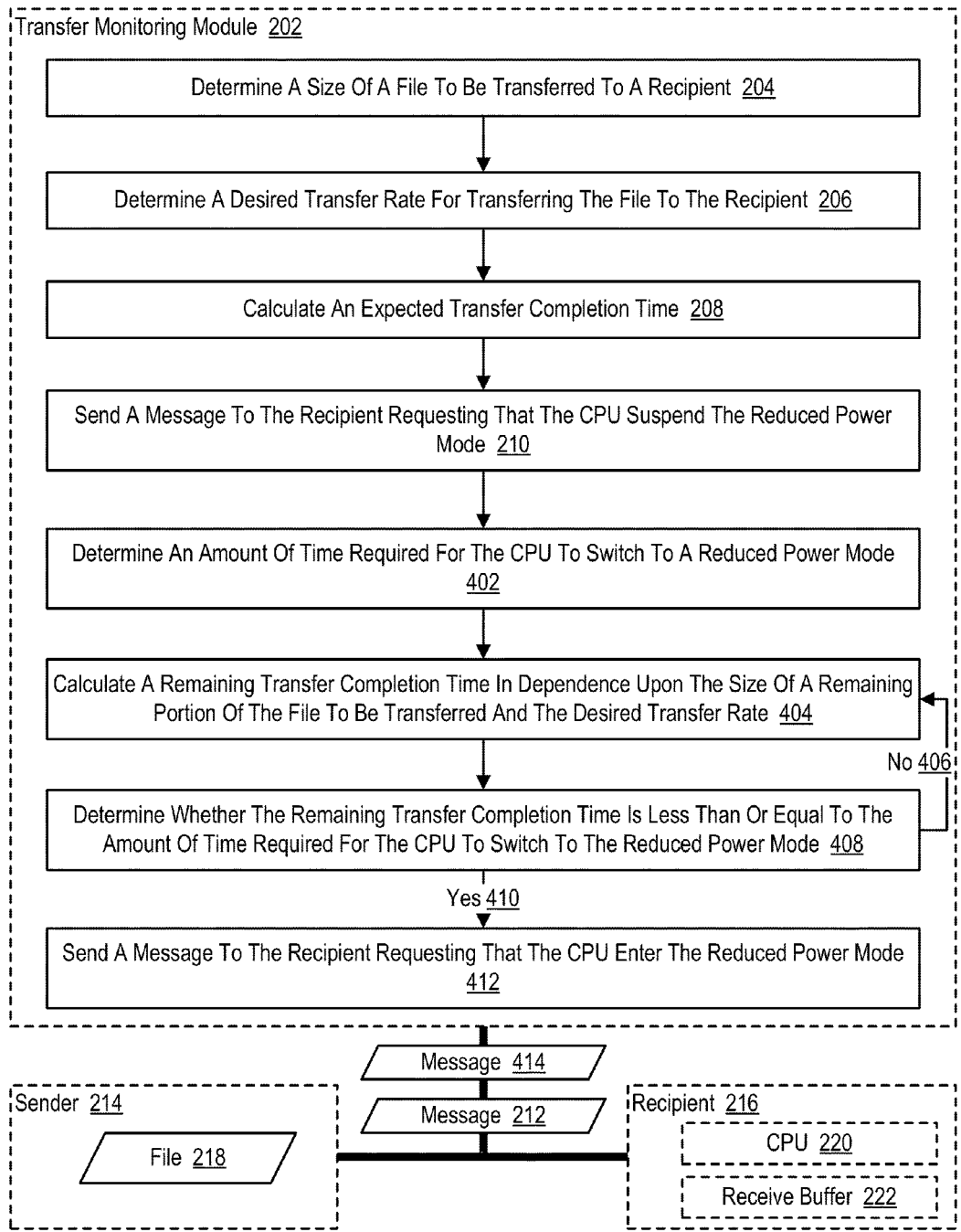
FIG. 4 sets forth a flow chart illustrating an additional example method for cooperative reduced power mode suspension for high I/O workloads according to embodiments of the present invention.

For further explanation, FIG. 4 sets forth a flow chart illustrating an additional example method for cooperative reduced power mode suspension for high I/O workloads according to embodiments of the present invention. The example method of FIG. 4 similar to the example method of FIG. 2 as it also includes determining (204) a size of a file (218) to be transferred to a recipient (216) by a sender (214), determining (206) a desired transfer rate for transferring the file (218) to the recipient (216), calculating (208) an expected transfer completion time in dependence upon the size of the file (218) and the desired transfer rate, and sending (210) a message (212) to the recipient (216) requesting that the CPU (220) suspend the reduced power mode in dependence upon the expected transfer completion time.

The example method of FIG. 4 also includes determining (402), by the transfer monitoring module (202), an amount of time required for the CPU (220) to switch to a reduced power mode. In the example method of FIG. 4, determining (402) an amount of time required for the CPU (220) to switch to a reduced power mode may be carried out, for example, by requesting such information from the recipient (216), by timing a switch from the CPU (220) operating in a full power mode to a reduced power mode, by a system administrator setting such a value as a system configuration variable, and so on.

The example method of FIG. 4 also includes calculating (404), by the transfer monitoring module (202), a remaining transfer completion time in dependence upon the size of a remaining portion of the file (218) to be transferred and the desired transfer rate. In the example method of FIG. 4, calculating (404) a remaining transfer completion time may be carried out by determining the size of the remaining portion of the file (218) to be transferred, determining the desired transfer rate, and dividing the size of the remaining portion of the file (218) to be transferred by the desired transfer rate. In such an example, calculating (404) a remaining transfer completion time may be carried out after some portion of the file (218) has been transferred to the recipient (216). For example, when a file (218) is of a size such that the file (218) can only be transferred to the recipient (216) by transmitting the file in a plurality of packets, calculating (404) a remaining transfer completion time may be carried out after some of the packets have already been transferred to the recipient (216).

The example method of FIG. 4 also includes determining (408), by the transfer monitoring module (202), whether the remaining transfer completion time is less than or equal to the amount of time required for the CPU (220) to switch to the reduced power mode. In the example method of FIG. 4, when the remaining transfer completion time is less than or equal to the amount of time required for the CPU (220) to switch to the reduced power mode, the transfer monitoring module (202) may initiate a switch of the CPU (220) from a full power mode to a reduced power mode because the transfer of the file (218) from the sender (214) to the recipient (216) will be completed by the time the CPU (220) actually switches to the reduced power mode. In the example method of FIG. 4, determining (408) whether the remaining transfer completion time is less than or equal to the amount of time required for the CPU (220) to switch to the reduced power mode may be carried out by the transfer monitoring module (202) comparing the remaining transfer completion time to the amount of time required for the CPU (220) to switch to the reduced power mode and determining which value is greater.

The example method of FIG. 4 also includes sending (412) a message (414) to the recipient (216) requesting that the CPU (220) enter the reduced power mode. In the example method of FIG. 4, sending (412) a message (414) to the recipient (216) requesting that the CPU (220) enter the reduced power mode is carried out in response to affirmatively (410) determining that the remaining transfer completion time is less than or equal to the amount of time required for the CPU (220) to switch to the reduced power mode. In such an example, in situations in which the transfer of the file (218) from the sender (214) to the recipient (216) is not complete, initiating the process of switching the CPU (220) of the recipient (216) to a reduced power mode will not hinder the ability of the recipient (216) to process packets received from the sender (214) as the CPU (220) of the recipient (216) will not actually enter a reduced power mode until the transfer is complete, given that the remaining transfer completion time is less than the amount of time required for the CPU (220) to switch to the reduced power mode. In the example method of FIG. 4, if it is determined that the remaining transfer completion time is not (406) less than or equal to the amount of time required for the CPU (220) to switch to the reduced power mode, execution of the method of FIG. 4 may return to step 404.

Figure 5:
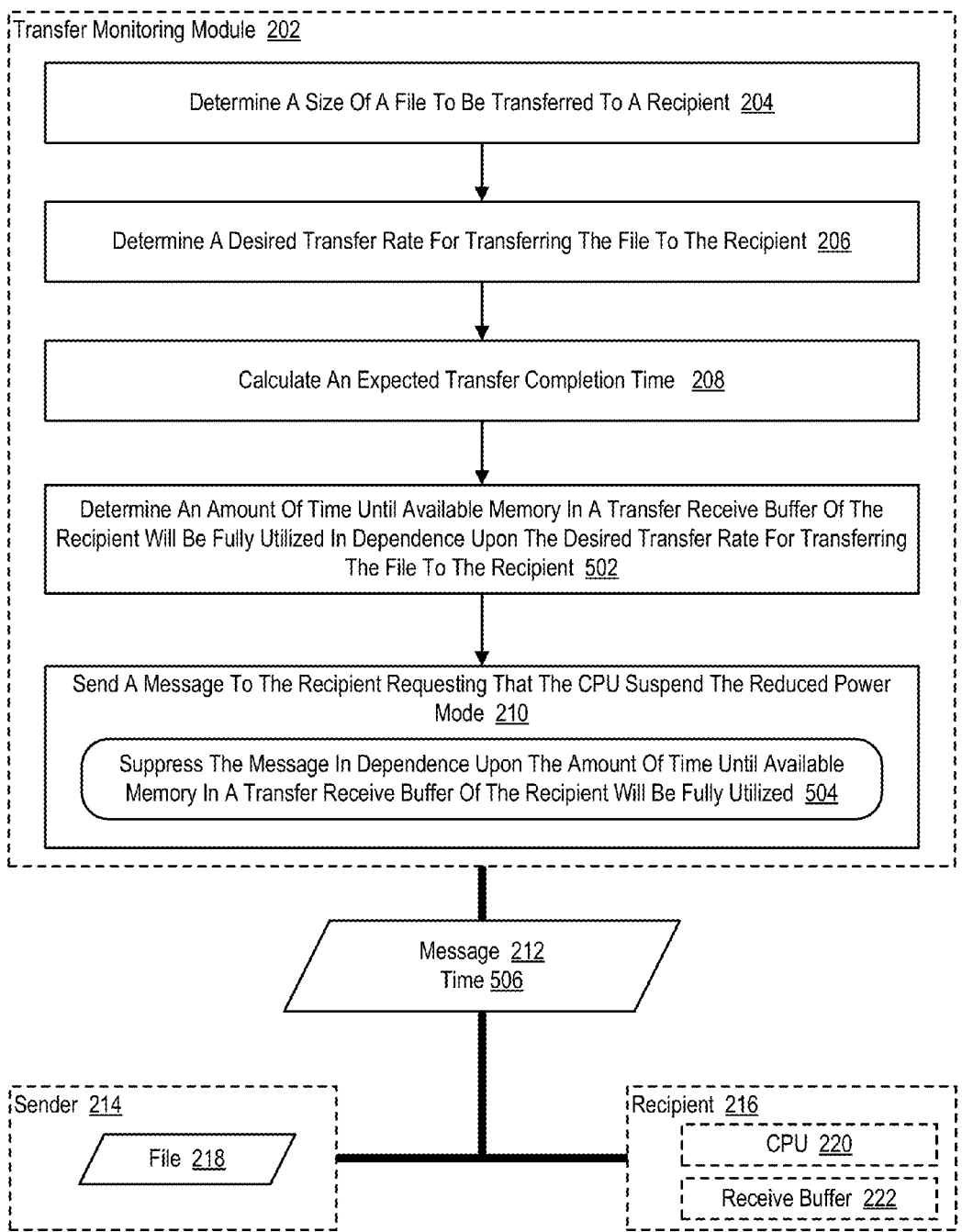
FIG. 5 sets forth a flow chart illustrating an additional example method for cooperative reduced power mode suspension for high I/O workloads according to embodiments of the present invention.

For further explanation, FIG. 5 sets forth a flow chart illustrating an additional example method for cooperative reduced power mode suspension for high I/O workloads according to embodiments of the present invention. The example method of FIG. 5 similar to the example method of FIG. 2 as it also includes determining (204) a size of a file (218) to be transferred to a recipient (216) by a sender (214), determining (206) a desired transfer rate for transferring the file (218) to the recipient (216), calculating (208) an expected transfer completion time in dependence upon the size of the file (218) and the desired transfer rate, and sending (210) a message (212) to the recipient (216) requesting that the CPU (220) suspend the reduced power mode in dependence upon the expected transfer completion time.

The method of FIG. 5 also includes determining (502), by the transfer monitoring module (202), an amount of time until available memory in a transfer receive buffer (222) of the recipient (216) will be fully utilized. Determining (502) an amount of time until available memory in a transfer receive buffer (222) of the recipient (216) will be fully utilized may be done in dependence upon the desired transfer rate for transferring the file (218) to the recipient (216) and the amount of available memory in the transfer receive buffer (222). In such an example, the transfer monitoring module (202) the amount of available memory in the transfer receive buffer (222) by requesting such information from the recipient (216), by determining the size of the transfer receive buffer (222) and tracking the entry and removal of data from the transfer receive buffer (222), and so on. The transfer monitoring module (202) may therefore divide the amount of available memory in the transfer receive buffer (222) by the desired transfer rate for transferring the file (218) to the recipient (216) to determine (502) an amount of time until available memory in a transfer receive buffer (222) of the recipient (216) will be fully utilized. In such a way, the (502) transfer monitoring module (202) may determine the amount of time that the CPU (220) of the recipient (216) may remain in the reduced power mode without causing the transmission of packets from the sender (214) to the recipient (216) to fail as the result of a full transfer receive buffer (222).

In the example method of FIG. 5, sending (210) a message (212) to the recipient (216) requesting that the CPU (220) suspend the reduced power mode in dependence upon the expected transfer completion time can include suppressing (504) the message in dependence upon the amount of time until available memory in the transfer receive buffer (222) of the recipient (216) will be fully utilized. Suppressing (504) the message (212) in dependence upon the amount of time until available memory in the transfer receive buffer (222) of the recipient (216) will be fully utilized may be carried out, for example, by delaying the transmission of the message (212) for an amount of time that is equal to the amount of time until available memory in the transfer receive buffer (222) of the recipient (216) will be fully utilized, by delaying the transmission of the message (212) for an amount of time that is equal to the sum of the amount of time until available memory in the transfer receive buffer (222) of the recipient (216) will be fully utilized and the amount of time required for the CPU (220) to switch to the reduced power mode, and so on.

In the example method of FIG. 5, the message (212) to the recipient (216) requesting that the CPU (220) suspend the reduced power mode can include a remaining expected transfer completion time (506). In the example method of FIG. 5, the recipient (216) may utilize remaining expected transfer completion time (506) to determine when the CPU (220) of the recipient (216) should re-enter a reduced power mode. For example, the recipient (216) request that the CPU (220) re-enter a reduced power mode upon the expiration of the remaining expected transfer completion time (506).

Figure 6:
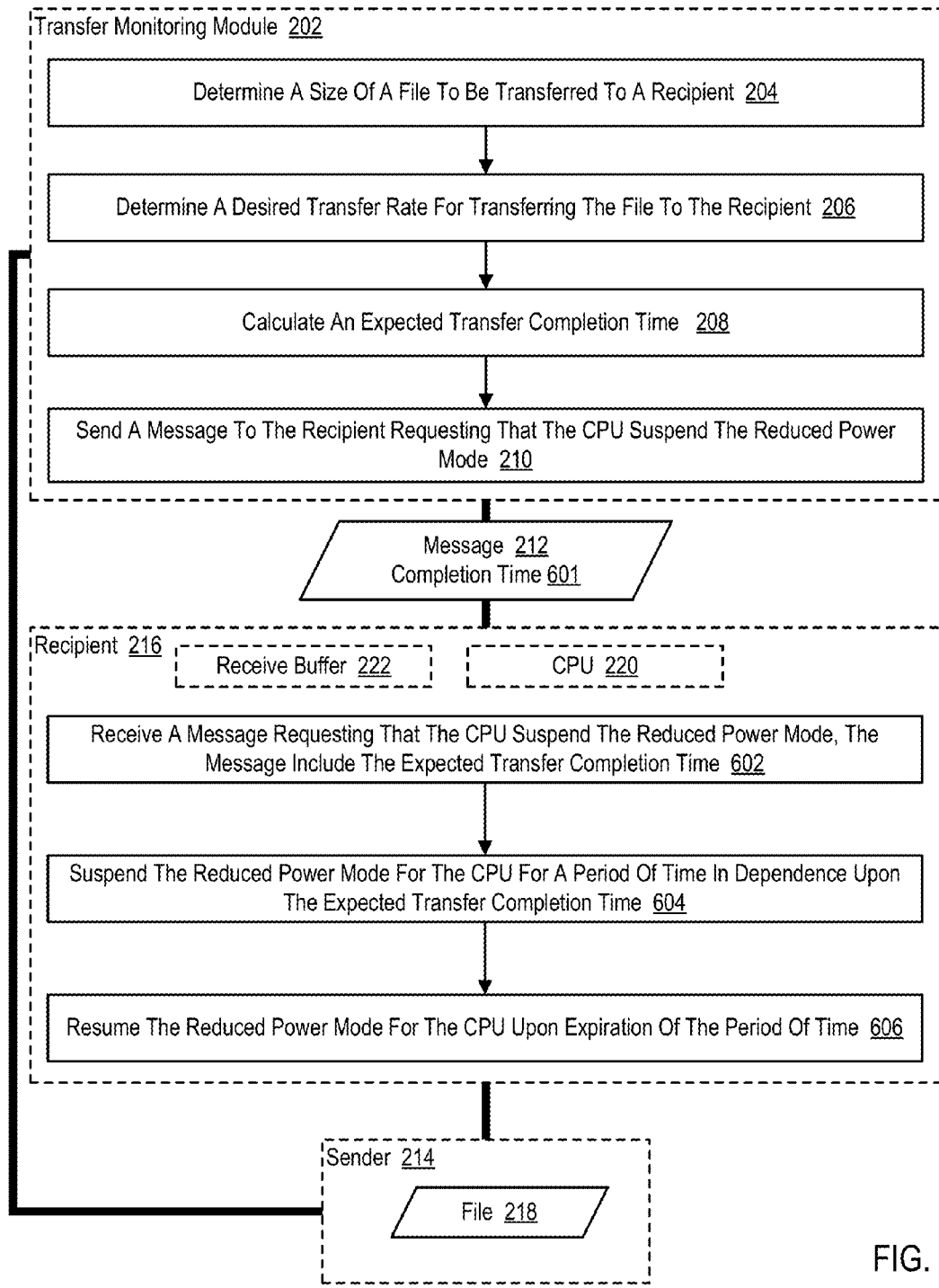
FIG. 6 sets forth a flow chart illustrating an additional example method for cooperative reduced power mode suspension for high I/O workloads according to embodiments of the present invention.

For further explanation, FIG. 6 sets forth a flow chart illustrating an additional example method for cooperative reduced power mode suspension for high I/O workloads according to embodiments of the present invention. The example method of FIG. 6 similar to the example method of FIG. 2 as it also includes determining (204) a size of a file (218) to be transferred to a recipient (216) by a sender (214), determining (206) a desired transfer rate for transferring the file (218) to the recipient (216), calculating (208) an expected transfer completion time in dependence upon the size of the file (218) and the desired transfer rate, and sending (210) a message (212) to the recipient (216) requesting that the CPU (220) suspend the reduced power mode in dependence upon the expected transfer completion time.

The example method of FIG. 6 also includes receiving (602), by the recipient (216), the message (212) requesting that the CPU (220) suspend the reduced power mode. In the example method of FIG. 6, the message can include the expected transfer completion time (601). In the example method of FIG. 6, the recipient (216) can receive (602) the message (212) requesting that the CPU (220) suspend the reduced power mode over a data communications link between the recipient (216) and the transfer monitoring module (202).

The example method of FIG. 6 also includes suspending (604), by the recipient (216), the reduced power mode for the CPU (220) for a period of time in dependence upon the expected transfer completion time. In the example method of FIG. 6, suspending (604) the reduced power mode for the CPU (220) may be carried out by the CPU (220) entering a higher performance, higher power consuming mode such as the p-state. In the example method of FIG. 6, the reduced power mode for the CPU (220) is suspended (604) for a period of time that is dependent upon the expected transfer completion time. For example, the reduced power mode for the CPU (220) may be suspended (604) for a period of time that is equal to the expected transfer completion time, for a period of time that is equal to the expected transfer completion time plus the amount of time required for the CPU (220) to switch to the reduced power mode, and so on.

The example method of FIG. 6 also includes resuming (606), by the recipient (216), the reduced power mode for the CPU (220) upon expiration of the period of time. In the example method of FIG. 6, resuming (606) the reduced power mode for the CPU (220) upon expiration of the period of time may be carried out by the CPU (220) entering a lower performance, lower power consuming mode such as the c-state.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for cooperative reduced power mode suspension for high input/output ('I/O') workloads, the apparatus comprising a computer processor, a computer memory operatively coupled to the computer processor, the computer memory having disposed within it computer program instructions that, when executed by the computer processor, cause the apparatus to carry out the steps of:

determining, by a transfer monitoring module, a size of a file to be transferred to a recipient, wherein the recipient includes a central processing unit ('CPU') operating in a reduced power mode;

determining, by the transfer monitoring module, a desired transfer rate for transferring the file to the recipient;

calculating, by the transfer monitoring module, an expected transfer completion time in dependence upon the size of the file and the desired transfer rate; and sending, by the transfer monitoring module, a message to the recipient requesting that the CPU suspend the reduced power mode in dependence upon the expected transfer completion time;

determining, by the transfer monitoring module, a size of memory free in a transfer receive buffer of the recipient;

determining, by the transfer monitoring module, whether the size of memory free in the transfer receive buffer of the recipient exceeds the size of the file to be transferred; and wherein, responsive to determining that the size of memory free in the transfer receive buffer of the recipient exceeds the size of the file to be transferred, sending the message to the recipient includes suppressing the message to the recipient requesting that the CPU suspend the reduced power mode.

2. An apparatus for cooperative reduced power mode suspension for high input/output ('I/O') workloads, the apparatus comprising a computer processor, a computer memory operatively coupled to the computer processor, the computer memory having disposed within it computer program instructions that, when executed by the computer processor, cause the apparatus to carry out the steps of:

determining, by a transfer monitoring module, a size of a file to be transferred to a recipient, wherein the recipient includes a central processing unit ('CPU') operating in a reduced power mode;

determining, by the transfer monitoring module, a desired transfer rate for transferring the file to the recipient;

calculating, by the transfer monitoring module, an expected transfer completion time in dependence upon the size of the file and the desired transfer rate; and sending, by the transfer monitoring module, a message to the recipient requesting that the CPU suspend the reduced power mode in dependence upon the expected transfer completion time;

determining, by the transfer monitoring module, an amount of time required for the CPU to switch to a reduced power mode;

calculating, by the transfer monitoring module, a remaining transfer completion time in dependence upon the size of a remaining portion of the file to be transferred and the desired transfer rate;

determining, by the transfer monitoring module, whether the remaining transfer completion time is less than or equal to the amount of time required for the CPU to switch to the reduced power mode; and responsive to determining that the remaining transfer completion time is less than or equal to the amount of time required for the CPU to switch to the reduced power mode, sending a message to the recipient requesting that the CPU enter the reduced power mode.

3. An apparatus for cooperative reduced power mode suspension for high input/output ('I/O') workloads, the apparatus comprising a computer processor, a computer memory operatively coupled to the computer processor, the computer memory having disposed within it computer program instructions that, when executed by the computer processor, cause the apparatus to carry out the steps of:

determining, by a transfer monitoring module, a size of a file to be transferred to a recipient, wherein the recipient includes a central processing unit ('CPU') operating in a reduced power mode;

determining, by the transfer monitoring module, a desired transfer rate for transferring the file to the recipient;

calculating, by the transfer monitoring module, an expected transfer completion time in dependence upon the size of the file and the desired transfer rate; and sending, by the transfer monitoring module, a message to the recipient requesting that the CPU suspend the reduced power mode in dependence upon the expected transfer completion time;

determining, by the transfer monitoring module, an amount of time until available memory in a transfer receive buffer of the recipient will be fully utilized in dependence upon the desired transfer rate for transferring the file to the recipient; and wherein sending, by the transfer monitoring module, a message to the recipient requesting that the CPU suspend the reduced power mode in dependence upon the expected transfer completion time further comprises suppressing the message in dependence upon the amount of time until available memory in a transfer receive buffer of the recipient will be fully utilized.

4. A computer program product for cooperative reduced power mode suspension for high input/output ('I/O') workloads, the computer program product disposed upon a computer readable medium excluding signals, the computer program product comprising computer program instructions that, when executed, cause a computer to carry out the steps of:

determining, by a transfer monitoring module, a size of a file to be transferred to a recipient, wherein the recipient includes a central processing unit ('CPU') operating in a reduced power mode;

determining, by the transfer monitoring module, a desired transfer rate for transferring the file to the recipient;

calculating, by the transfer monitoring module, an expected transfer completion time in dependence upon the size of the file and the desired transfer rate; and sending, by the transfer monitoring module, a message to the recipient requesting that the CPU suspend the reduced power mode in dependence upon the expected transfer completion time;

determining, by the transfer monitoring module, a size of memory free in a transfer receive buffer of the recipient;

determining, by the transfer monitoring module, whether the size of memory free in the transfer receive buffer of the recipient exceeds the size of the file to be transferred; and wherein, responsive to determining that the size of memory free in the transfer receive buffer of the recipient exceeds the size of the file to be transferred, sending the message to the recipient includes suppressing the message to the recipient requesting that the CPU suspend the reduced power mode.

5. A computer program product for cooperative reduced power mode suspension for high input/output ('I/O') workloads, the computer program product disposed upon a computer readable medium excluding signals, the computer program product comprising computer program instructions that, when executed, cause a computer to carry out the steps of:

determining, by a transfer monitoring module, a size of a file to be transferred to a recipient, wherein the recipient includes a central processing unit ('CPU') operating in a reduced power mode;

determining, by the transfer monitoring module, a desired transfer rate for transferring the file to the recipient;

calculating, by the transfer monitoring module, an expected transfer completion time in dependence upon the size of the file and the desired transfer rate; and sending, by the transfer monitoring module, a message to the recipient requesting that the CPU suspend the reduced power mode in dependence upon the expected transfer completion time;

determining, by the transfer monitoring module, an amount of time required for the CPU to switch to a reduced power mode;

calculating, by the transfer monitoring module, a remaining transfer completion time in dependence upon the size of a remaining portion of the file to be transferred and the desired transfer rate;

determining, by the transfer monitoring module, whether the remaining transfer completion time is less than or equal to the amount of time required for the CPU to switch to the reduced power mode; and responsive to determining that the remaining transfer completion time is less than or equal to the amount of time required for the CPU to switch to the reduced power mode, sending a message to the recipient requesting that the CPU enter the reduced power mode.

6. A computer program product for cooperative reduced power mode suspension for high input/output ('I/O') workloads, the computer program product disposed upon a computer readable medium excluding signals, the computer program product comprising computer program instructions that, when executed, cause a computer to carry out the steps of:

determining, by a transfer monitoring module, a size of a file to be transferred to a recipient, wherein the recipient includes a central processing unit ('CPU') operating in a reduced power mode;

determining, by the transfer monitoring module, a desired transfer rate for transferring the file to the recipient;

calculating, by the transfer monitoring module, an expected transfer completion time in dependence upon the size of the file and the desired transfer rate; and sending, by the transfer monitoring module, a message to the recipient requesting that the CPU suspend the reduced power mode in dependence upon the expected transfer completion time;

determining, by the transfer monitoring module, an amount of time until available memory in a transfer receive buffer of the recipient will be fully utilized in dependence upon the desired transfer rate for transferring the file to the recipient; and wherein sending, by the transfer monitoring module, a message to the recipient requesting that the CPU suspend the reduced power mode in dependence upon the expected transfer completion time further comprises suppressing the message in dependence upon the amount of time until available memory in a transfer receive buffer of the recipient will be fully utilized.

* * * * *